Oct. 13, 1970   O. B. CRUSE   3,533,661
CONTROL VALVE
Filed Oct. 29, 1968
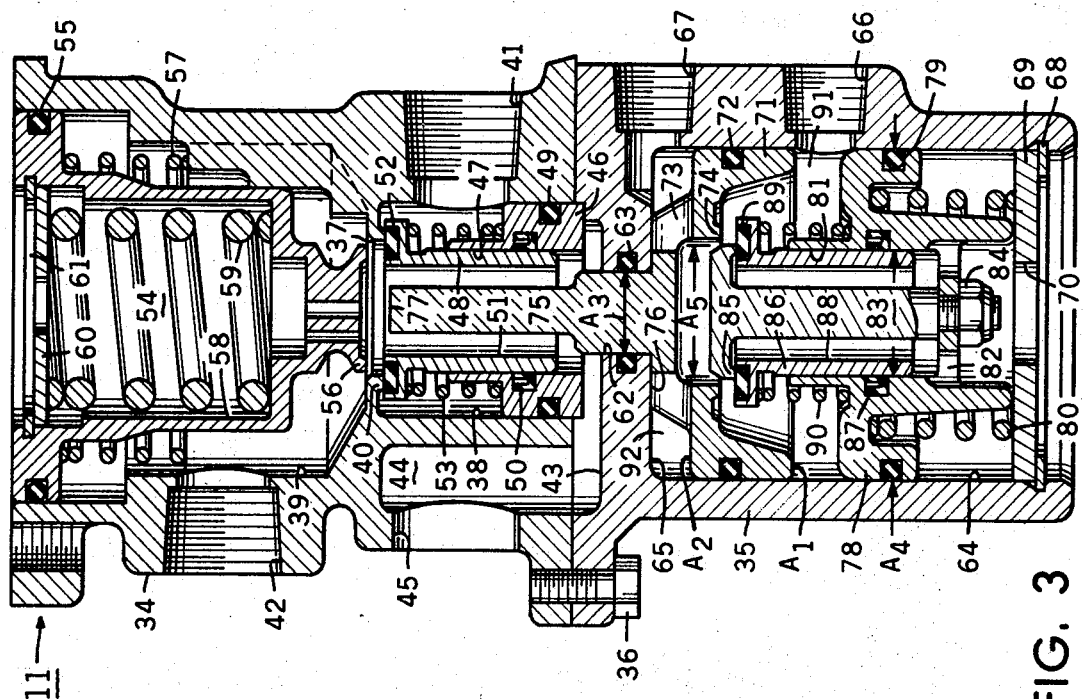
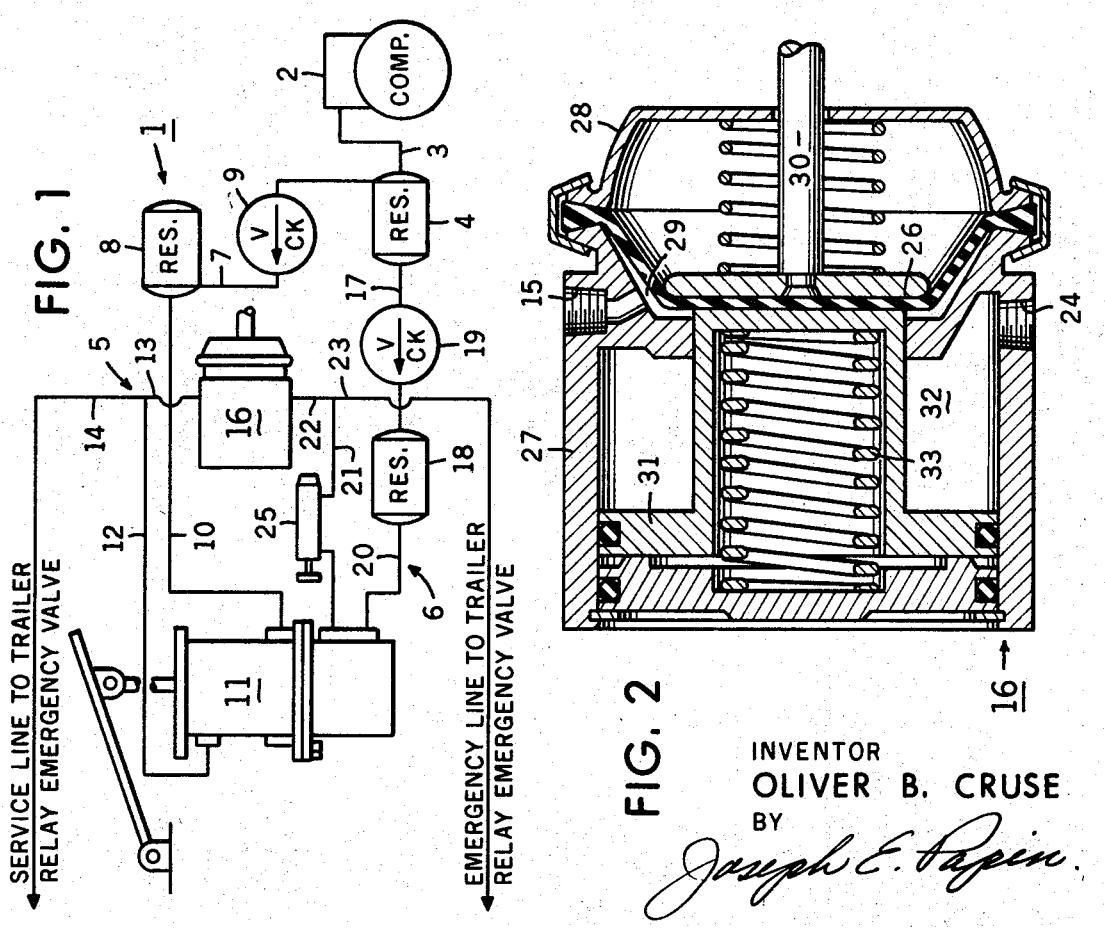
INVENTOR
OLIVER B. CRUSE
BY
Joseph E. Papin

United States Patent Office

3,533,661
Patented Oct. 13, 1970

3,533,661
CONTROL VALVE
Oliver B. Cruse, Florissant, Mo., assignor to Wagner Electric Corporation, Newark, N.J., a corporation of Delaware
Filed Oct. 29, 1968, Ser. No. 771,559
Int. Cl. B60t 13/44, 15/02
U.S. Cl. 303—68
25 Claims

ABSTRACT OF THE DISCLOSURE

A control valve having a service member for applying service fluid pressure to the service portion of a spring set brake device to normally effect service energization of a brake connected therewith and an emergency member actuated by said service member in the event of the failure of the service fluid pressure for venting emergency fluid pressure normally applied to the emergency portion of said spring set brake device to the atmosphere to effect mechanical emergency energization of said brake, and a resilient member responsive to emergency fluid pressure less than a predetermined value for automatically isolating the emergency fluid pressure supply and venting the emergency fluid pressure applied to the emergency portion of said spring set brake device to the atmosphere.

---

This invention relates to fluid pressure systems and control valves therefor and in particular to those control valves for effecting both service and emergency energization of said fluid pressure systems.

In the past fluid pressure systems, a friction device operating cylinder was provided with a service or fluid pressure responsive motor operatively connected with a friction device and selectively subjected to service fluid pressure from a source thereof to effect service energization of said friction device, and said friction device operating cylinder was also provided with an emergency or resiliently urged motor responsive to emergency fluid pressure less than a predetermined value supplied thereto from another or a protected emergency fluid pressure source to drivingly actuate said service motor and thereby mechanically effect emergency energization of said friction device. A control valve was also provided in such past systems having a service application member therein movable in response to an operator applied force to selectively apply service fluid pressure from the service source to the service motor of the friction device operating cylinder for effecting the service energization of the friction device; however, in the event of the failure of the service fluid pressure, said service application member was movable in response to the operator applied force to drivingly actuate an emergency application member provided in said control valve to isolate the emergency source and thereafter vent the emergency fluid pressure acting on the resiliently urged motor of the friction device operating cylinder to the atmosphere effecting a metered reduction thereof to a value less than the predetermined value, and said resiliently urged motor was thereafter movable to drivingly actuate said service motor to effect mechanical emergency energization of the friction device. One of the disadvantageous or undesirable features of such past systems and control valves therefor was that in the event the emergency fluid pressure in the system was reduced below the predetermined value to effect actuation of the resiliently urged motor and the resulting mechanical emergency energization of the friction device, the emergency application member of the control valve was still operable to effect partial release of said friction device. In other words, subsequent to the mechanical emergency energization of the friction device with the emergency fluid pressure less than the predetermined value, the emergency application member was movable in response to the operator controlled force thereon to a position again connecting the resiliently urged motor in pressure fluid communication with the emergency source to effect partial de-actuation thereof along with the partial de-energization or release of the friction device. Another disadvantageous or undesirable feature of such past systems and control valves was that such past control valves lacked the necessary automatic characteristics for automatically isolating the emergency source from the friction device operating cylinder and thereafter venting the emergency fluid pressure acting on the resiliently urged motor of said friction device operating cylinder to the atmosphere when the emergency fluid pressure at said emergency source was reduced to a value less than the predetermined value. And another disadvantageous or undesirable feature emanating from the previously mentioned disadvantageous feature was that when a trailer relay-emergency valve, or other such related valving, was utilized in the system it could not be actuated in conjunction with such past control valves due to the lack of the necessary automatic characteristics of such past control valves for venting the emergency portion of said trailer relay-emergency valves to the atmosphere to effect the attending emergency function thereof for automatically energizing the trailer brakes.

The principal object of the present invention is to provide a novel fluid pressure system and a novel control valve therefor which overcome the aforementioned undesirable and disadvantageous features of such past systems and control valves, and this, as well as other objects and advantageous features for the present invention, will become apparent hereinafter.

Briefly, the present invention embodies a control valve having a pair of application means for effecting the application through said control valve of fluid pressure supplied thereto, one of said application means being movable relative to the other of said application means in response to an applied force toward a position isolating the supplied fluid pressure and venting the applied fluid pressure to the atmosphere, and said other application means being automatically movable relative to said one application means in response to supplied fluid pressure less than a predetermined value toward a position also isolating the supplied fluid pressure and venting the applied fluid pressure to the atmosphere. Another embodiment of the invention includes third application means movable in said control valve in response to an applied force for effecting the application therethrough of other fluid pressure, and force transmitting means engageable between said one and third application means for effecting concerted movement thereof in the event of the failure of the other fluid pressure. And further, another embodiment of the invention includes a fluid pressure system having a pair of sources for said first named and other fluid pressures and a pair of fluid pressure responsive motors operatively controlled by said one and other application means and said third application means, one of said motors being operative to effect normal energization of a friction device in response to the other fluid pressure applied thereto from said other fluid pressure source upon the actuation of said third application means, the concerted actuation of said one and third application means upon the failure of said other fluid pressure source serving to isolate said first named fluid pressure source from the other of said motors and vent the first named fluid pressure normally applied to said other motor to the atmosphere to effect actuation of said other motor and the emergency energization of said friction device, and said other motor also being actuated to effect emergency energization of said friction device in response to the automatic actuation of said other application means upon the reduction of the magnitude of the first named fluid pressure at said first named fluid pressure source to a value less than the predetermined value.

In the drawings which illustrate embodiments of the invention and wherein like numerals refer to like parts wherever they occur:

FIG. 1 is a diagrammatic view illustrating a fluid pressure system embodied in the present invention, FIG. 2 is an enlarged sectional view showing the friction device operating mechanism in the system of FIG. 1 in cross-section, and FIG. 3 is another enlarged sectional view showing the control valve of FIG. 1 also embodied in the present invention in cross-section.

Referring now to the drawings in detail and in particular to FIGS. 1 and 2, a fluid pressure system 1 is provided with pressure generating means, such as a compressor 2, connected by a conduit 3 with a main or system reservoir 4, said compressor and main reservoir forming in combination a fluid pressure source, and said system is also provided with service and emergency branches indicated generally at 5, 6. The service branch 5 is provided with a conduit 7 connected between the main reservoir 4 and a protected service or branch reservoir 8, and a unidirectional flow or check valve 9 is interposed in said conduit between said main and service reservoirs to protect said service reservoir against fluid pressure loss in the event of leakage or depletion of fluid pressure in said main reservoir. A conduit 10 is connected between the service reservoir 8 and a service inlet port of a control valve 11, and another conduit or service line 12 has one end connected with a service outlet port of said control valve while the other end thereof branches at 13, 14 for connection with a service port 15 of a friction device operating mechanism or spring set brake cylinder 16 which is well known to the art and for connection with the service portion of a trailer relay-emergency valve (not shown) which is also well known to the art, respectively. The emergency branch 6 is provided with a conduit 17 interposed between the main reservoir 4 and a protected emergency or branch reservoir 18, and another unidirectional flow or check valve 19 is interposed in said conduit between said main and emergency reservoirs to protect said emergency reservoir against fluid pressure loss in the event of leakage or depletion of fluid pressure in said main reservoir. A conduit 20 is connected between an emergency inlet port of the control valve 11 and the emergency reservoir 18, and another conduit 21 has one end connected with an emergency outlet port of said control valve while the other end thereof branches at 22, 23 for connection with an emergency port 24 of the spring set brake cylinder 16 and for connection with the emergency line to the emergency portion of the trailer relay-emergency valve (not shown) which is well known in the art, respectively. A push-pull valve 25, also of a type well known to the art, is interposed in the conduit 21, said push-pull valve being manually operable between a connecting position providing pressure fluid communication between the emergency outlet port of the control valve 11 and the cylinder emergency port 24 and a venting position interrupting pressure fluid communication between said emergency outlet port of said control valve and said cylinder emergency port and venting said cylinder emergency port to the atmosphere.

The brake cylinder 16 is provided with a fluid pressure responsive motor or diaphragm 26 engaged between interconnected housings 27, 28 defining with the housing 25 an expansible service chamber 29, and the service port 15 which receives the service line 13, as previously mentioned, is also provided in the housing 27 connected with said service chamber. The diaphragm 26 is drivingly engaged with resiliently urged linkage or push rod 30 which is, in turn, operatively connected with a friction device (not shown). Another fluid pressure responsive motor or stepped piston 31 is slidable in the housing 27 defining therewith an expansible emergency chamber 32 and extending into the service chamber 29 for driving mechanical engagement with the diaphragm 26 and push rod 30. To complete the description of the system 1 and brake cylinder 16, the emergency port 24 of said brake cylinder which receives the conduit 22, as previously mentioned, is provided in the housing 27 connecting with the emergency chamber 32, and an emergency spring 33 is biased between said housing and the piston 31 urging said piston against fluid pressure expansion of the emergency chamber 32 and toward driving mechanical engagement with the diaphragm 26 and push rod 30.

The control valve 11, FIG. 3, is provided with upper and lower housings 34, 35 which are interconnected by suitable means, such as a plurality of studs 36. The upper housing 34 is provided with a bore 37 axially interposed between a counterbore 38 and a stepped counterbore 39 forming a set of inlet and outlet chambers, and a valve seat 40 is defined on said housing in circumscribing relation with said bore. A service inlet port 41 which receives the conduit 10, as previously mentioned, is provided in the upper housing 34 connecting with the counterbore 38, and a service outlet port 42 which receives the conduit 12, as previously mentioned, is also provided in said upper housing connecting with the counterbore 39. A recess 43 is provided in the upper end of the lower housing 35 beneath the counterbore 38 forming an exhaust chamber in combination with a communicating exhaust passage port 44, 45 provided in the upper housing 34. A valve guide member 46 is received in the counterbore 38 in seating engagement with the upper end of the lower housing 35 having a bore 47 therethrough in which a valve element or member 48 is slidable, and seals 49, 50 are carried by said valve guide member in sealing engagement with the counterbore 40 and said valve element, respectively. The valve element 48 is provided with an axial bore or exhaust opening 51 therethrough, and an annular seal or disc 52 is provided on the upper end of said valve element in circumscribing relation with said exhaust opening, said seal being normally urged into sealing engagement with the valve seat 40 by a valve spring 53 biased between said valve element and the valve guide member 46.

An application or valve control member, such as the piston 54, is slidably received in the counterbore 39 and carries a peripheral seal 55 in sealing engagement with said counterbore. The piston 54 is provided with a valve seat 56 on the lower end thereof which is substantially coaxial with the upper housing bore 37 and normally maintained in spaced relation with the valve element seal 52 by a return spring 57 biased between said piston and the housing 34. A metering spring bore 58 is provided in the piston 54, and a pre-compressed metering spring 59 is retained therein between said piston by a retainer or treadle force receiving plate 60 which is biased into abutment with a snap ring and groove assembly 61 provided in the upper end of said metering spring bore.

The lower housing 35 is provided with a bore 62 having a seal 63 disposed therein, and said bore is connected between the lower housing recess 43 and a counterbore 64, said bore and counterbore defining a shoulder 65 therebetween. An emergency inlet port 66 which receives the conduit 20, as previously mentioned, is provided in the lower housing 35 intersecting with the counterbore 64 adjacent to the mid-portion thereof, and an emergency outlet port 67 which receives the conduit 21, as previously mentioned, is also provided in said lower housing intersecting with said counterbore 64 adjacent to the shoulder 65. A snap ring and groove assembly 68 is provided adjacent to the lower end of the counterbore in displacement preventing engagement with a closure member or retainer plate 69 which is received in said counterbore defining the lower end wall thereof, and an aperture 70 which defines an exhaust port is provided in said closure member connecting with said counterbore.

An application or valve control member, such as the piston 71, is slidably received in the lower housing counterbore 64 between the inlet and outlet ports 66, 67, said piston having a peripheral seal 72 in sealing engagement with said lower housing counterbore. A passage 73 is provided through the piston 71 between the inlet and outlet ports 66, 67, and a valve seat 74 is provided on said piston in circumscribing relation to said passage. A push rod or force transmitting member 75 is integrally connected with said piston and slidably received in the lower housing bore 62 in sealing engagement with the seal 63 disposed therein, said push rod defining with said piston a shoulder 76 normally in sealing engagement with the lower housing shoulder 65, and said push rod also having an upper end 77 for abutting driven engagement with the piston 54 and normally predeterminately spaced therefrom. It should be noted that the piston 71 is provided with opposed substantially equal effective areas $A_1$, $A_2$ substantially defined between the sealing engagement of the piston seal 72 with the lower housing counterbore 64 and the piston valve seat 74 and subjected to the fluid pressure at the inlet and outlet ports 66, 67, respectively, and another area $A_3$ is also provided on the piston 71 substantially defined by the sealing engagement of the stem 75 with the seal 63, said area $A_3$ being additive to the area $A_1$ and subjected to the fluid pressure at the outlet port 67.

Another application or resiliently urged member, such as the piston 78, is slidably received in the lower housing counterbore 64 between the inlet port 66 and the closure member 69 having a peripheral seal 79 in sealing engagement with said lower housing counterbore, and a pre-compressed spring 80 is contained between said piston and said closure member. The piston 78 is provided with a bore 81 therein, and a plurality of passages 82 intersect with the lower end wall of said bore to connect said bore in open pressure fluid communication with the outlet port 70. A valve seating member 83 extends coaxially through the piston bore 81 having its lower end threaded for fixed connection to the piston 78 by suitable means, such as a nut 84, while the upper end thereof defines a valve seat 85. Another valve element or member 86 is slidably received in the piston bore 81 in sealing engagement with a seal 87 disposed in said piston bore and having an exhaust passage 88 provided therethrough in pressure fluid communication with the exhaust port 70. An annular disc or seal 89 is provided on the upper end of the valve member 83 in circumscribing relation with the exhaust passage 88 for sealing engagement with both valve seats 74, 85, and said seal is normally urged into sealing engagement with the valve seat 85 by a valve spring 90 biased between the piston 78 and the valve element 86. An inlet chamber 91 is provided in the lower housing counterbore 64 between the pistons 71, 78 in open pressure fluid communication with the inlet port 66, and an outlet chamber 92 is also provided in said lower housing counterbore between the piston 71 and the housing shoulder 65 in open pressure fluid communication with the outlet port 67. To complete the description of the control valve 11, it should be noted that the piston 78 is provided with an effective area $A_4$ substantially defined between the sealing engagement of the seal 79 with the lower housing counterbore 64 and the piston bore 81 and subjected to the fluid pressure at the inlet port 66, and another area $A_5$ is provided on the seating member 83 substantially defined by the seating engagement of the seating member valve seat 85 with the valve element 86 and subjected to the fluid pressure at the outlet port 67.

In the operation with the push-pull valve 25 in its connecting position, fluid pressure generated by the compressor 2 flows through the conduit 3 to the main reservoir 4 and therefrom through the conduit 7, the uni-directional valve 9, the service reservoir 8 and the conduit 10 of the service branch 5 into the service inlet port and chamber 41, 38 of the control valve 11. In the emergency branch 6, the fluid pressure also flows from the main reservoir 4 through the conduit 17, the unidirectional valve 19, the emergency reservoir 18 and the conduit 20 into the emergency inlet port and chamber 66, 91 of the control valve 11 acting on the effective area $A_4$ of the piston 78 to establish a holding force, and when the magnitude of the emergency fluid pressure in said emergency inlet chamber exceeds a predetermined value, the holding force overcomes the compressive force of the spring 80 urging said piston toward its inoperative position into engagement with the closure member 69, as shown in FIG. 3. The fluid pressure flows from the emergency inlet chamber 91 through the passage 73 of the piston 71, the emergency outlet chamber and port 92, 67, the conduits 21, 22 and the push-pull valve 25 into the emergency port and chamber 24, 32 of the brake cylinder 16. It should be noted that with the piston 78 in its inoperative position, the emergency fluid pressure applied to the emergency outlet port 67 also acts on the area $A_5$ of said piston establishing a supplemental force additive to the holding force to maintain said piston in its inoperative position. When the established fluid pressure in the cylinder emergency chamber 32 acting on the effective area of the stepped piston 31 therein exceeds the predetermined value, said stepped piston is urged leftwardly toward its normal or inoperative position against the emergency spring 33 to contain the compressive force thereof, as shown in FIG. 2. At the same time, the emergency fluid pressure also flows from the conduit 21 through the conduit 23 to actuate the emergency portion of the trailer relay-emergency valve, as is well known in the art.

If the operator desires to effect a service braking application under normal operating conditions, a manually applied force on the force receiving plate 60 of the control valve 11 is transmitted through the metering spring 59 to the piston 54 moving said piston downwardly against the compressive force of the return spring 57. This downward movement initially engages the piston valve seat 56 with the valve element 48 closing the exhaust passage 51 thereof and isolating the outlet chamber 39 from the atmosphere, and said downward movement thereafter urges said valve element against the valve spring 53 to a position disengaged from the upper housing valve seat 40 to establish pressure fluid communication between the inlet and outlet ports 41, 42. The service fluid pressure flows in the service branch 5 from the inlet port 41 through the inlet and outlet chambers 38, 39 and the connecting bore or passage 37, the outlet port 42, and the service lines 12, 13 into the service port and chamber 15, 29 of the brake cylinder 16. The service fluid pressure so established in the brake cylinder service chamber 29 acts on the effective area of the diaphragm 26 to create an application force which concertedly moves said diaphragm and the linkage 30 rightwardly in a direction to effect energization of the friction device (not shown) associated therewith. At the same time, the established service fluid pressure also flows from the service line 12 through the conduit 14 to actuate the service portion of the trailer relay-emergency valve, as is well known to the art.

When the reaction force created by the established fluid pressure in the control valve outlet chamber 39 acting on the effective area of the piston 54 therein equals the manually applied force, said piston is moved upwardly against the metering spring 59 to position the valve element 48 in lapped engagement with both the upper housing valve seat 40 and the piston valve seat 56. The reaction force acting through the metering spring 58 affords the operator a direct and accurate "feel" as to the extent or intensity of the braking effort or application. If a greater braking application is desired, the manually applied force is increased which results in an increased application force to further energize the friction device, as well as an increased reaction force, and the component parts of the control valve 11 function in the same manner as previously described to again move said component parts to their lapped positions.

When the desired braking effort is attained, the manually applied force is removed from the force receiving plate 60, and the return spring 57 moves the piston 54 upwardly toward its original position. Since the valve element 48 is urged by its spring 53 into lapped engagement with the upper housing valve seat 40 interrupting pressure fluid communication between the inlet and outlet ports 41, 42, this upward movement of the piston 54 disengages the valve seat 56 thereof from said valve element to again open the valve element exhaust passage 51 re-establishing pressure fluid communication between the outlet and exhaust ports 42, 45. In this manner service fluid pressure is exhausted to the atmosphere from the cylinder service chamber and port 29, 15 through the service lines 12, 13, the control valve outlet-port and chamber 42, 39, the valve element exhaust passage 51, and the housing recess, passage and exhaust port 43, 44, 45. Upon such exhaustion of the service fluid pressure from the cylinder service chamber 29, the application force is, of course, eliminated and the diaphragm and linkage 26, 30 return to their original positions effecting the de-energization of the friction device associated therewith. At the same time, the service fluid pressure is also exhausted from the service portion of the trailer relay-emergency valve to effect de-actuation thereof through the conduits 14, 12 and the control valve 11, as described above.

In the event of the failure of the service branch 5 with a resultant loss of the fluid pressure in the service reservoir 8 which effects emergency vehicle operating conditions, the manually applied force moves the piston 54 downwardly to actuate the valve element 48; and since it is assumed that the service branch 5 has failed effecting the emergency condition, the establishment of fluid pressure in said service branch to effect the normal service energization of the friction device and the service portion of the trailer relay-emergency valve, as previously described, is obviated. Of course, when such service energization of the friction device is not effected due to the aforementioned malfunction of the service branch, the natural instinct or tendency of the operator is to further actuate the force applying treadle or pedal, and in this manner, further downward movement of the piston 54 drivingly engages said piston with the push rod abutment 77 to effect concerted downward movement of the piston and push rod 71, 75 therewith. This concerted downward movement of the pistons and push rod 54, 71, 75 initially moves the piston valve seat 74 into seating engagement with the valve element 86 to isolate the fluid pressure at the emergency inlet port 66 from that at the emergency outlet port 67 and thereafter moves said valve element to a position disengaged from the valve seat 85 to establish metered pressure fluid communication between the emergency outlet and exhaust ports 67, 70. The metered exhaustion of the fluid pressure is effected from the brake cylinder emergency chamber and port 33, 24 to the atmosphere through the conduits 20, 21 and the push-pull valve 25, the control valve emergency outlet port and chamber 67, 92, the piston passage 73, the valve element exhaust passage 88 and the bore and passages 81, 82 of the piston 78, and the emergency exhaust port 70 to the atmosphere. When the fluid pressure in the brake cylinder emergency chamber 32 acting on the effective area of the stepped piston 31 therein is reduced below the predetermined value, the compressive force of the emergency spring 33 concertedly moves said stepped piston and the diaphragm and linkage 26, 30 in a rightward direction to mechanically effect energization of the friction device (not shown) under the emergency conditions. When the valve element 86 is disengaged from the valve seat 85 to effect such metered exhaustion of the emergency fluid pressure from the brake cylinder emergency chamber 32, it should be noted that the effective area $A_1$ of the piston 71 is subjected to the isolated fluid pressure at the emergency inlet port 66 and that the areas $A_2$, $A_3$ of said piston are subjected to the reduced fluid pressure at the emergency outlet port 67 to establish a differential reaction force acting across said piston which is transmitted through the push rod 75 and the piston 54 to the metering spring 59 in opposition to the manually applied force thereon.

When the magnitude of the differential reaction force substantially equals that of the applied force, the pistons and push rods 54, 71, 75 are concertedly moved upwardly against the metering spring 59 to position the valve element 86 in lapped engagement with both of the valve seats 75, 85. The differential reaction force acting through the metering spring 59 against the manually applied force affords the operator a direct and accurate "feel" as to the extent or intensity of the braking effort or application under emergency conditions. If a greater braking effort is desired under emergency conditions, the manually applied force is increased which results in an increased differential reaction force wherein the component parts of the control valve 11 function in the same manner as previously described to again move said component parts to their lapped positions, and the compressive force of the emergency spring 33 is responsive to such metered exhaustion of the fluid pressure in the brake cylinder emergency chamber 32 to increase the mechanical energization of the friction device under emergency condition as previously described. It should also be noted that emergency fluid pressure is exhausted from the emergency portion of the trailer relay-emergency valve to effect the emergency actuation thereof, as well known in the art, through the conduits and push-pull valves 23, 21, 25 and the control valve 11, as previously described.

When the desired braking effort is attained under the emergency conditions, the manually applied force is removed from the piston 54 and the differential reaction force serves to move the piston 71 upwardly toward its original position. Since the valve element 86 is urged by its spring 90 into engagement with the valve seat 85 interrupting pressure fluid communication between the emergency outlet and exhaust ports 67, 70, the upward movement of the piston 71 re-engages the abutment 76 thereof with the housing shoulder 65 and disengages the valve seat 74 from the valve element 86 to re-establish pressure fluid communication between the emergency inlet and outlet ports 66, 67, and the push rod 75 and piston 54 are also concertedly driven upwardly toward their original positions in response to the upward movement of the piston 71. In this manner, fluid pressure again flows from the emergency inlet port 66 through the inlet and outlet chambers 91, 92, the outlet port 67 and the conduits 21, 22, 23 to the brake cylinder emergency port and chamber 24, 30 and to the emergency portion of the trailer relay-emergency valve, respectively. When the fluid pressure in the brake cylinder chamber 32 is re-established to a value in excess of the predetermined value, the force of the re-established fluid pressure in said chamber acting on the effective area of the stepped piston 31 therein again urges said stepped piston leftwardly toward its normal or inoperative position to contain the compressive force of the emergency spring 33, and the diaphragm and linkage 26, 30 are concertedly movable with said stepped piston in the leftward direction toward their normal or inoperative positions to effect the de-energization of the friction device under emergency conditions. The re-establishment of the emergency fluid pressure to a magnitude in excess of the predetermined value is also effective through the conduit 23 to de-actuate the emergency portion of the trailer relay-emergency valve.

In the event of a failure in the emergency branch 6 with the resultant reduction of the emergency fluid pressure in the emergency reservoir 18 to a value less than the predetermined value, the holding and supplemental forces of the reduced emergency fluid pressure acting on the effective areas $A_4$, $A_5$ of the piston 78 are correspondingly reduced, and the compressive force of the spring 80 overcomes such reduced holding and supplemental forces to effect automatic movement of said piston 78 upwardly in the lower housing counterbore 64 toward its operative position. This upward movement of the piston 78 initially engages the valve element 86 with the valve seat 74 of the piston 71 isolating the reduced emergency fluid pressure at the emergency inlet port 66 from that at the emergency outlet port 67 and thereafter disengages the valve seat 85 from said valve element to automatically establish open pressure fluid communication between said emergency outlet port and the emergency exhaust port 70 which, of course, eliminates the supplemental force. In this manner, the emergency fluid pressure is simultaneously and automatically exhausted from the emergency portion of the trailer relay-emergency valve and the emergency chamber 30 of the brake cylinder 16 through the conduits 21, 22, 23 and the push-pull valve 25, the control valve emergency outlet port and chamber 67, 92, the passage 73 of the piston 71, the valve element exhaust passage 88, the bore and passages 81, 82 of the piston 78, and the exhaust port 70 to the atmosphere. Of course, such exhaustion of the emergency fluid pressure from the brake cylinder 16 effects the mechanical function thereof to mechanically energize the friction device connected therewith and also effects the emergency function of the emergency portion of the trailer relay-emergency valve, as previously mentioned.

It should be noted that the control valve 11 is provided with a "non-releasing" feature which is effective to prevent the partial release of the friction device upon manual actuation of said control valve under the emergency operating conditions created by the failure of the emergency fluid pressure to a value less than the predetermined value. For instance, when the emergency fluid pressure is reduced to a value less than the predetermined value and the piston 78 is in its operative position urging the valve element 88 into engagement with the valve seat 74 and disengaging the valve seat 85 from said valve element to automatically effect open pressure fluid communication between the emergency outlet and exhaust ports 67, 70, as described above, the concerted manual actuation of the pistons and push rod 54, 71, 75 in response to an applied force merely serves to further disengage said valve element from the valve seat 85. Further, the abutting engagement of the piston abutment surface 76 with the housing shoulder 65 obviates relative movement of the piston 71 upwardly with respect to the piston 78 in its operative position thereby obviating the possibility of re-establishing pressure fluid communication between the emergency inlet and outlet ports 66, 67 when the emergency fluid pressure is less than the predetermined value; therefore, it is obvious that emergency fluid pressure cannot be applied to the brake cylinder 16 to effect a partial release of the stepped piston 31 and the attendant partial release of the friction device.

If the operator desires to park the vehicle with the system 1 functioning under normal operating conditions, the push-pull valve 25 is manually moved from its connecting position to its venting position interrupting pressure fluid communication through the conduit 21 between the emergency outlet port 67 of the control valve 11 and the brake cylinder emergency port 24 and venting said brake cylinder emergency port to the atmosphere. In this manner, the emergency fluid pressure in the emergency portion of the trailer relay-emergency valve and in the brake cylinder emergency chamber 30 is "dumped" to atmosphere through conduits 21, 22, 23 and the push-pull valve 25 to effect simulated emergency actuation of the trailer relay-emergency valve and the brake cylinder 16, as previously described.

The embodiments of the invention in which an exclusive property or privilege is claimed are defined as follows:

1. A control valve comprising a housing, a pair of application means relatively movable in said housing between inoperative and operative positions for controlling the application through said housing of fluid pressure supplied thereto, said application means each being respectively movable relative to each other from their respective inoperative positions toward their respective operative positions in said housing to isolate the supplied fluid pressure from the applied fluid pressure and vent the applied fluid pressure to the atmosphere, and an area on one of said application means subjected to the supplied fluid pressure, said one application means being automatically actuated toward its operative position upon the reduction of the supplied fluid pressure acting on said area to a value less than a predetermined value and means for subjecting said other application means to an applied force to move said other application means into operative position when said one application means is in its inoperative position.

2. The control valve according to claim 1, wherein said one application means comprises resiliently urged means, said area being on said resiliently urged means, and said resiliently urged means being urged against its own force toward its inoperative position in said housing to effect the application through said housing of the supplied fluid pressure in response to the supplied fluid pressure in excess of the predetermined value acting on said area and being automatically movable by its own force toward its operative position upon the reduction of the supplied fluid pressure to a value less than the predetermined value.

3. The control valve according to claim 1, comprising opposed effective areas on the other of said application means for respective subjection to the supplied and applied fluid pressures, said other application means being movable in response to said applied force toward its operative position wherein the isolated supplied fluid pressure acting on one of said opposed areas and the reduced applied fluid pressure acting on the other of said opposed areas establish a differential force in opposition to the applied force on said other application means.

4. The control valve according to claim 3, comprising a third area on said other application means for subjection to the applied fluid pressure and additive to said one opposed area, the applied fluid pressure acting on said third area to establish another force in opposition to the applied force and normally urging said other application means toward an inoperative position in said housing effecting the application therethrough of the supplied fluid pressure.

5. The control valve according to claim 1, wherein said one application means is normally urged toward its inoperative position in said housing to effect the application therethrough of the supplied fluid pressure in response to the supplied fluid pressure in excess of the predetermined value acting on said area, a pair of opposed areas on the other of said application means for respective subjection to the supplied and applied fluid pressures, said other application means being movable in response to said applied force toward its operative position wherein the isolated supplied fluid pressure acting on one of said opposed areas and the reduced applied fluid pressure acting on the other of said opposed areas establish a differential force acting across said other application means in opposition to the applied force when said one application means is in its inoperative position.

6. The control valve according to claim 2, wherein said other application means and said resiliently urged means define with said housing a flow passage for the application therethrough of the supplied fluid pressure, valve means movable in said resiliently urged means for engagement with said other application means and controlling communication through said flow passage between the supplied and applied fluid pressures and between the applied fluid pressure and the atmosphere, said other application means being movable toward its operative position in response to said applied force to engage and move said valve means toward a position in said flow passage interrupting communication therethrough between the supplied and applied fluid pressures and establishing communication between the applied fluid pressure and the atmosphere when said resiliently urged means is in its inoperative position, and said resiliently urged means being initially movable toward its operative position when said other application means is in its inoperative position to engage said valve means with said other application means interrupting communication through said flow passage between the supplied and applied fluid pressures and thereafter further movable relative to said valve means to establish communication between the applied fluid pressure and the atmosphere.

7. The control valve according to claim 6, comprising a valve seat on said other application means about said flow passage for engagement with said valve means, said valve seat being engaged with said valve means to interrupt communication through said flow passage between the supplied and applied fluid pressures upon the applied force movement of said one application means.

8. The control valve according to claim 6, comprising a valve seat on said resiliently urged means, said valve means being normally urged into engagement with said valve seat to interrupt communication between the applied fluid pressure and the atmosphere, and said valve means being disengaged from said valve seat to establish communication between the applied fluid pressure and the atmosphere upon the applied force movement of said other application means toward its operative position when said resiliently urged means is in its inoperative position and upon the automatic movement of said resiliently urged means toward its operative position when said other application means is in its inoperative position.

9. The control valve according to claim 6, comprising a valve seat on said resiliently urged means, said valve means being normally urged into engagement with said valve seat to interrupt communication between the applied fluid pressure and the atmosphere when said resiliently urged means is in its inoperative position, another valve seat on said other application means about said flow passage for engagement with said valve means, the applied force movement of said other application means initially moving said other valve seat into engagement with said valve means to interrupt communication through said flow passage between the supplied and applied fluid pressures and thereafter concertedly moving said valve means toward a position disengaged from said first named valve seat to establish communication between the applied fluid pressure and the atmosphere, and said resiliently urged means being initially movable toward its operative position when said other application means is in its inoperative position to engage said valve means with said other valve seat interrupting communication through said flow passage between the supplied and applied fluid pressures and thereafter further movable relative to said valve means to disengage said first named valve seat therefrom and establish communication between the applied fluid pressure and the atmosphere.

10. The control valve according to claim 9, wherein said resiliently urged means includes piston means movable in said housing, and resilient means urging said piston means toward said other application means, said first named valve seat being on said piston means, and said valve means being movable in said piston means.

11. The control valve according to claim 10, wherein said piston means and valve means define exhaust passage means for venting the applied fluid pressure to the atmosphere, a seating member extending through said exhaust passage means having one end connected with said piston means and the other end thereof defining said first named valve seat, and a valve spring urging said valve means toward engagement with said first named valve seat.

12. A control valve comprising a housing having inlet, outlet and exhaust ports therein, resiliently urged means movable in said housing between said inlet and outlet ports including valve means for controlling pressure fluid communication between said inlet, outlet and exhaust ports, a valve control member movable in said housing between said inlet and outlet ports for engagement with said valve means, an area on said resiliently urged means for subjection to fluid pressure at said inlet port, said resiliently urged means being restrained against its own force in one position in said housing where said valve means are disengaged from said valve control member to establish pressure fluid communication between said inlet and outlet ports in response to fluid pressure at said inlet port in excess of a predetermined value acting on said area, said resiliently urged means also being initially movable in response to its own force upon the reduction of the fluid pressure at said inlet port acting on said area to a value less than the predetermined value to engage said valve means with said valve control member and interrupt pressure fluid communication between said inlet and outlet ports and thereafter further movable relative to said valve means into another position establishing pressure fluid communication between said outlet and exhaust ports, and means for subjecting said valve control member to an applied force to move said member and engage and move said valve means toward a position interrupting pressure fluid communication between said inlet and outlet ports and establishing pressure fluid communication between said outlet and exhaust ports when said resiliently urged means is in the first named position thereof.

13. The control valve according to claim 12, comprising opposed effective areas on said valve control member for respective subjection to the fluid pressures at said inlet and outlet ports, one of said areas being responsive to the fluid pressure at said inlet port and the other of said areas being responsive to the reduced fluid pressure at said outlet port to establish a differential force opposing the applied force upon actuation of said valve means in response to the applied force movement of said valve control member when said resiliently urged means is in its first named position.

14. The control valve according to claim 13, comprising a third area on said valve control member for subjection to the fluid pressure at said outlet port and additive to said one area, the fluid pressure at said outlet port acting on said third area to establish another force in opposition to the applied force and normally urging said valve control member from said valve means toward abutting engagement with said housing.

15. The control valve according to claim 12, comprising a valve seat on said valve control member between said inlet and outlet ports for engagement with said valve means, said valve seat being engaged with said valve means to interrupt pressure fluid communication between said inlet and outlet ports upon the applied force movement of said valve control member and upon the movement of said resiliently urged means to its other position.

16. The control valve according to claim 12, comprising a valve seat on said resiliently urged means between said outlet and exhaust ports, said valve means being urged into engagement with said valve seat to interrupt pressure fluid communication between said outlet and exhaust ports, and said valve means being disengaged from said valve seat to establish the pressure fluid communication between said outlet and exhaust ports upon the applied force movement of said valve control member and upon the movement of said resiliently urged means toward its other position.

17. The control valve according to claim 12, comprising a valve seat on said resiliently urged means between said outlet and exhaust ports, said valve means being urged into engagement with said valve seat to interrupt fluid communication between said outlet and exhaust ports when said resiliently urged means is in its one position, another valve seat on said valve control member between said inlet and outlet ports for engagement with said valve means, the applied force movement of said valve control member initially moving said other valve seat into engagement with said valve means to interrupt pressure fluid communication between said inlet and outlet ports and thereafter disengaging said valve means from said first named valve seat to establish pressure fluid communication between said outlet and exhaust ports when said resiliently urged means is in its one position, and the movement of said resiliently urged means toward its other position initially engaging said valve means with said other valve seat to interrupt pressure fluid communication between said inlet and outlet ports and thereafter disengaging said first named valve seat from said valve means to establish pressure fluid communication between said outlet and exhaust ports.

18. The control valve according to claim 15, comprising passage means in said valve control member for communication between said inlet and outlet ports and extending through said valve seat, said passage means being closed upon the engagement of said valve seat and said valve means.

19. The control valve according to claim 16, comprising means in said resiliently urged means including said valve seat defining exhaust passage means for communication between said outlet and exhaust ports, said exhaust passage means being closed when said valve means is engaged with said valve seat.

20. The control valve according to claim 17, comprising passage means in said valve control member for communication between said inlet and outlet ports and extending through said other valve seat, said passage means being closed upon the engagement of said valve means and other valve seat, and other means in said resiliently urged means including said valve seat and valve means defining exhaust passage means for communication between said outlet and exhaust ports, said exhaust passage means being closed when said valve means is engaged with said valve seat.

21. The control valve according to claim 20, wherein said resiliently urged means includes piston means movable in said housing between said inlet and outlet ports, said area being on said piston means, resilient means engaged with said piston means and opposing movement thereof toward its first named position in response to the fluid pressure at said inlet port in excess of the predetermined value acting on said area, and said other means being in said piston means.

22. The control valve according to claim 17, wherein said resiliently urged means includes piston means movable in said housing between said inlet and outlet ports, said area being on said piston means, resilient means engaged with said piston means and opposing movement thereof toward its first named position, said piston means and valve means defining exhaust passage means between said outlet and exhaust ports, and a seating member extending through said exhaust passage means having one end connected with said piston means and the other end thereof defining said first named valve seat, and a valve spring urging said valve means toward engagement with said first named valve seat.

23. A control valve comprising a housing, a pair of application means relatively movable in said housing between inoperative and operative positions for controlling the application through said housing of fluid pressure supplied thereto, said application means each being respectively movable relative to each other from their respective inoperative positions toward their respective operative positions in said housing to isolate the supplied fluid pressure from the applied fluid pressure and vent the applied fluid pressure to the atmosphere, one of said application means having valve means movable therein for engagement with said other application means, first resilient means biasing the said one application means in the housing and second separate resilient means for biasing said valve means for engagement with said other application means and an area on said one application means being subjected to the supplied fluid pressure, said one application means being automatically actuated toward its operative position by said bias upon the reduction of the supplied fluid pressure acting on said area to a value less than a predetermined value.

24. A structure as specified in claim 23 which includes means for subjecting said other application means to an applied force to move said other application means into operative position.

25. A control valve comprising a housing having a bore therein connected with a counterbore, a shoulder on said housing adjacent to the juncture of said bore and counterbore, said housing including closure means for said counterbore and spaced from said shoulder, an outlet port in said housing intersecting with said counterbore adjacent to said shoulder, an inlet port in said housing intersecting with said counterbore between said outlet port and said closure member, a first piston slidable in said counterbore between said inlet and outlet ports including an applied force transmitting portion slidable in said bore, a connecting passage in said first piston between said inlet and outlet ports, a first valve seat on said first piston about said passage, first and second substantially equal and opposed areas on said first piston respectively subjected to the fluid pressures at said inlet and outlet ports, a third area on said first piston additive to said first area and subjected to the fluid pressure at said outlet port, said third area being responsive to the fluid pressure at said outlet port acting thereon to normally urge said first piston toward abutment with said shoulder, an exhaust port in said closure member, a second piston slidable in said counterbore between said inlet port and closure member and having opposed faces, one of said faces defining a fourth area for subjection to the fluid pressure at said inlet port, an exhaust port in said housing connected with said counterbore adjacent to the other face of said second piston, a valve bore in said second piston having an end intersecting with said one face of said second piston, a portion on said second piston defining the other end of said valve bore, other passage means in said second piston portion between said other face of said second piston and said other end of said valve bore connecting said valve bore in pressure fluid communication with said exhaust port, a valve member slidable in said valve bore, an exhaust passage extending through said valve member and substantially coaxial with said valve bore, a seating member extending through said valve bore and exhaust passage having one end connected with said second piston portion and the other end thereof defining a second valve seat, a valve spring engaged between said second piston and said valve member urging said valve means toward engagement with said second valve seat, said second piston means being urged toward a position in engagement with said closure member and spacing said valve member from said first named valve seat to establish pressure fluid communication between said inlet and outlet ports in response to fluid pressure at said inlet port in excess of a predetermined value acting on said fourth area, and spring means engaged between said second piston and said closure member and opposing movement of said second piston toward its position in engagement with said closure member, said second piston being movable in response to the force of said spring means in the event that the fluid pressure at said inlet port acting on said fourth area is reduced to a value less than the predetermined value to initially engage said valve member with said first named valve seat closing said connecting passage and interrupting pressure fluid communication between said inlet and outlet ports and thereafter disengage said second valve seat from said valve member opening said exhaust passage and establishing pressure fluid communication between said outlet and exhaust ports, and said first piston means being movable in response to an applied force on said force transmitting portion to initially engage said first named valve seat with said valve member closing said connecting passage and interrupting pressure fluid communication between said inlet and outlet ports and thereafter move said valve member toward a position disengaged from said second valve seat to open said exhaust passage and establish pressure fluid communication between said outlet and exhaust ports when said second piston is in its position in engagement with said closure member, the fluid pressure at said inlet port acting on said first area and the reduced fluid pressure at said outlet port acting on said second area to establish a differential reaction force in opposition to the applied force.

References Cited
UNITED STATES PATENTS

| | | | |
|---|---|---|---|
| 3,188,916 | 6/1965 | Beatty. | |
| 3,273,950 | 9/1966 | Vielmo | 303—40 X |
| 3,394,968 | 7/1968 | Bueler | 303—68 |
| 3,419,315 | 12/1968 | Bueler | 303—40 X |
| 3,464,742 | 9/1969 | Cruse | 303—13 |

MILTON BUCHLER, Primary Examiner

J. J. McLAUGHLIN, Jr., Assistant Examiner

U.S. Cl. X.R.

91—434; 137—627.5; 303—9, 13, 40, 52